Figure 1:
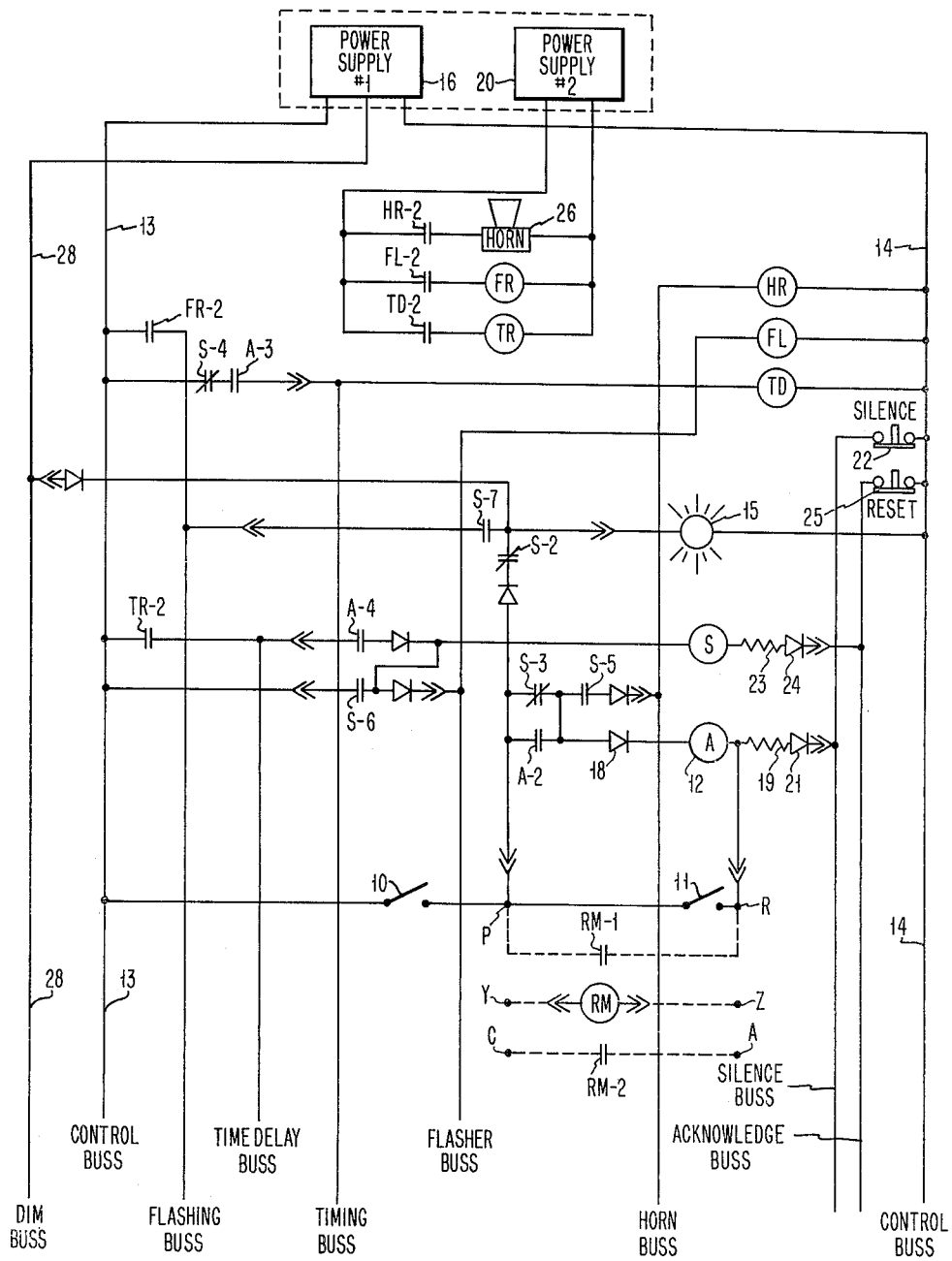

United States Patent Office 3,246,310
Patented Apr. 12, 1966

3,246,310
CONTROL AND ANNUNCIATOR SYSTEM
Roland C. Keller, 2081 Texas Way, San Mateo, Calif., and Richard W. Corey, 364 Ferndale Ave., South San Francisco, Calif.
Filed Feb. 4, 1963, Ser. No. 255,936
10 Claims. (Cl. 340—223)

This invention relates in general to annunciator systems, and relates more particularly to novel control and interlocking and visual indicating means for such systems.

Annunciator systems are commonly used to monitor the condition of a number of variables or devices to detect abnormal conditions therein. Such systems usually include an element associated with each device or variable which is responsive to the variable or condition to produce one output when the condition is normal and another output when the condition is abnormal. Each condition-responsive element is associated with relay circuitry which in turn controls various audible and visual alarm annunciator units. Where a large number of test points or variables are involved, such as is common in power plants and other large industrial installations, the various relay circuits controlled by the condition-responsive elements are tied into common busses wherever possible and brought to a central indicating and control panel where, by means of indicating lights or the like, an operator may monitor the various test points and may perform various control operations with respect thereto.

It is common to include on such a control panel a separate light for each test point which lights up when the associated test point becomes abnormal, and an audible alarm common to all of the test points which is sounded when any test point becomes abnormal. This audible alarm attracts the operator's attention to a particular part of the control panel which indicates the location of the abnormal condition. An alarm silence pushbutton is usually provided to deenergize the audible alarm device so that the operator can work on the abnormal condition without distraction and so that the audible alarm will be in condition to be operated by a subsequently occurring abnormality at another test point.

There are many annunciator applications where devices are to be started in sequence and it is essential that one device in the sequence start and operate properly before the next device in the sequence is started. One example of such a sequential chain of devices is in air conditioning apparatus in which a circulating air fan may first be turned on, followed by the starting of a chilled water pump, if the fan is running properly. In accordance with an important feature of this invention, there is provided auxiliary relay apparatus which is an integral part of an annunciator unit and which is effective to control the sequential starting of a chain of such devices and to so interlock this starting that the energization of any device in the chain is dependent upon the successful operation of the preceding device. In the event of improper operation of any device in the chain, audible and visual alarms are activated in that annunciator unit and no further devices in the chain may be started until the trouble has been cleared.

In accordance with another feature of this invention, there is provided novel time delay circuitry associated with an annunciator circuit which effectively disables the alarm circuits for a predetermined length of time after energization of the load device to permit the load device to assume normal operation before the alarm circuits are activated. This disablement for a predetermined length of time after energization prevents permature alarming which would otherwise occur if the alarm circuits were activated simultaneously with the energization of the load device. An example of this situation is in connection with the air conditioning fan mentioned above, where the condition used as a measure of the normal operation of the fan is its air flow output and where this flow might not reach its normal value for several seconds after energization.

Another novel feature of the present annunciator unit is the use of a dual intensity visual alarm device to provide a readily detectable indication of an abnormal condition. Many prior art annunciators have utilized alarm lights which flashed on and off as an indication of an abnormality, but the present invention provides a light which burns at a low intensity on a standby basis when the associated load device is not energized and burns at a steady, higher intensity when the device is energized. Upon occurrence of an abnormal condition, the light flashes between the high intensity and the low intensity, the low intensity being much lower than the high intensity but still detectable by an attendant. This low intensity light during standby operation provides a ready basis for determining the condition of the bulb without requiring special circuits to test indicator bulbs, as is often the case in prior art systems.

It is therefore an object of this invention to provide an annunciator system for the sequential starting and operation of a chain of load devices utilizing individual annunciator units for each load device, each such unit having as an integral part thereof relay apparatus which is effective to control and interlock the load device associated therewith to prevent energization of the next device in the chain until that load device is operating properly.

It is an additional object of the present invention to provide an annunciator unit for use in conjunction with a load device, in which the alarm circuits are disabled for a predetermined period after energization of the load device to permit the load device to assume normal operation without permature alarming.

It is a further object of this invention to provide an annunciator unit having a novel visual alarm device which burns at a low intensity when its associated load device is on a standby basis and burns at a higher intensity when the load device is energized, which further flashes alternately between the low intensity and the high intensity upon occurrence of an abnormal condition in its associated load device.

Figure 2:
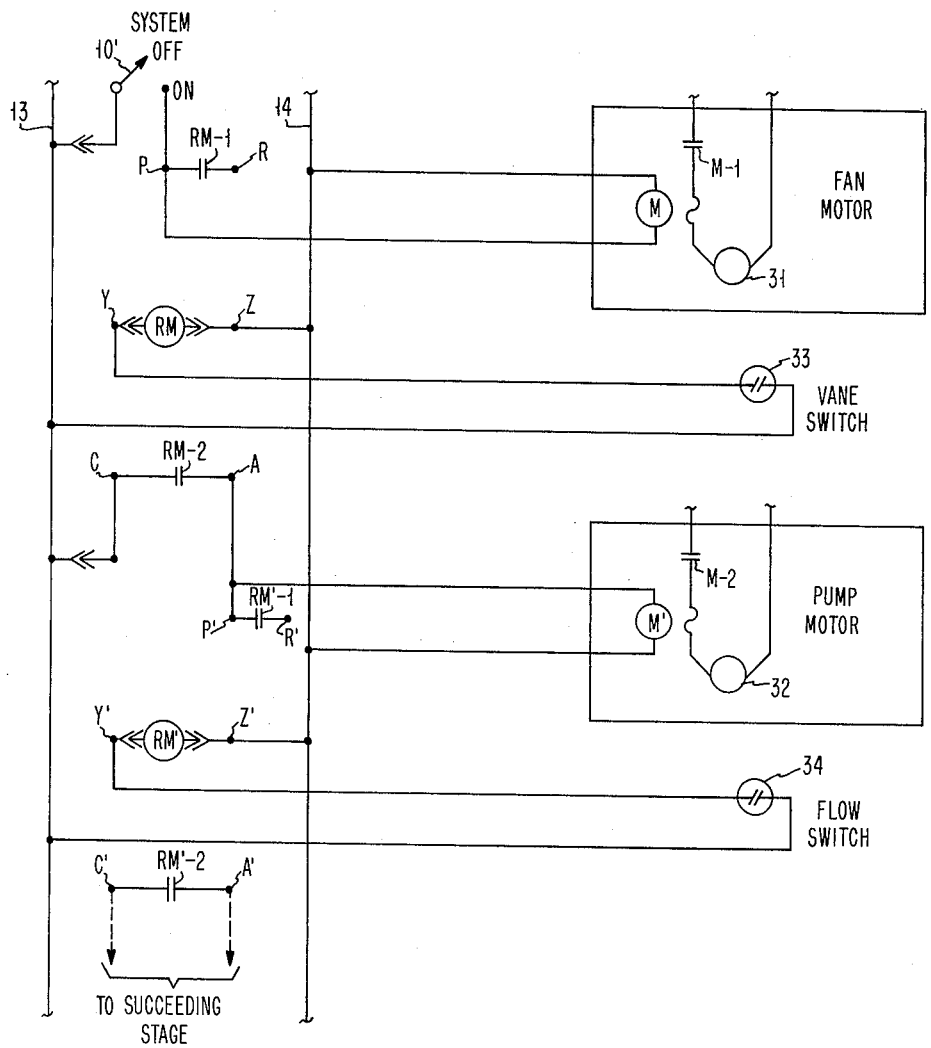

Objects and advantages other than those set forth above will be apparent from the following description when read in connection with the accompanying drawings, in which:

FIG. 1 schematically illustrates one annunciator unit in accordance with the present invention utilized to monitor the starting and operation of a load device; and FIG. 2 schematically illustrates the operation of the integral auxiliary relay apparatus of the annunciator units in controlling and interlocking the starting and running operation of a chain of sequential and dependent load devices.

It will be understood that although only one annunciator unit is shown in detail in FIG. 1, in practice a large number of such circuits will generally be employed in a given installation to monitor the different variables or conditions involved. In the drawing, the different busses which would be common to a large number of annunciator units similar to the one shown have been labelled to explain their function.

The monitored device or condition may be of any suitable type, and for the present purposes it is assumed that the load is an electrical device, such as a motor or heating unit, which is to be started through starting contacts 10 and operated, and the annunciator circuit of the present invention is to provide an indication if the starting is not normal or if any abnormal conditions occur during operation of the device. Further, the load device may be one in a chain of sequential devices which are to be started sequentially through means including the auxiliary relay apparatus of the invention, as will be described in detail in connection with FIG. 2. Some indication or proof must be provided that the load device is operating as desired after starting, and this "proof" is represented diagrammatically in FIG. 1 by contacts 11. It is assumed that contacts 11 are associated with the load device and are in the open condition when the load is deenergized and for a short time after starting, and that these contacts close when the device is operating satisfactorily.

The auxiliary relay which is an integral part of the annunciator unit of this invention is identified as RM and is provided with at least two sets of normally open contacts RM-1 and RM-2. In actual use, contacts RM-1, which are shown connected in dotted lines between points P and R, may perform the function of proof contacts 11, as will be described in detail in connection with FIG. 2, but for the purpose of explaining the operation of the annunciator unit, it may be assumed that proof contacts 11 function as described to provide a measure of the operating condition of a load device.

Proof contacts 11 are associated with a relay A so as to control the dropping out or picking up of this relay in dependence upon the condition of the proof contacts. The coil of relay A is connected across the terminals 13, 14 of a D.C. power supply 16 through a circuit which can be traced as follows: from conductor 13 through the closed contacts of the starting switch 10, the normally closed contacts S-3 of a relay S, a diode 18, the coil of relay A, a resistor 19, a diode 21, and then to conductor 14 through the contacts of a normally closed "silence" pushbutton switch 22 which will be described more in detail below. Thus, relay A picks up immediately upon closing of start switch 10, as long as proof contacts 11 are open, and seals itself in through its contacts A-2 which are in parallel with contacts S-3.

It will be noted that prior to closure of start switch 10, the annunciator light 15 for the unit is connected to a "dim bus" conductor 28 which has a reduced voltage thereon relative to that of conductors 13, 14, so that light 15 in the standby condition burns steadily at a reduced but detectable intensity. Closure of start switch 10 connects annunciator light 15 through the normally closed contacts S-2 of relay S to conductors 13, 14 to cause this light to burn steadily at an intensity much higher than that from dim bus 28.

Closure of contacts A-3 of relay A completes the energizing circuit for the coil of a time delay relay TD through normally closed contacts S-4 of relay S. Relay TD then picks up and closes its contacts TD-2 to connect the coil of a timer TR across an A.C. power source 20. Timer TR is provided to introduce a time delay in the annunciator circuits to permit the load device to properly warm up or otherwise function after starting, thus preventing premature alarming which would otherwise occur if the annunciator circuits were energized simultaneously with startup of the load device.

Timer TR is chosen to have a delay longer than the normal warmup time of the load; thus, if the load is operating satisfactorily shortly after energization, timer TR is not further utilized on that cycle. In a representative installation, in which the load device has a warmup time of 5 seconds, timer TR could be provided with a time delay of 15 seconds.

If proof contacts 11 close at, say, 5 seconds after energization, indicating normal operation of the load, this closure shorts out relay coil A, thereby dropping out this relay to deenergize time delay relay TD and timer TR. With relay coil A shorted out, the voltage between supply conductors 13, 14 is absorbed across resistor 19. Under these conditions, none of the alarm devices in the annunciator is actuated, and the operation of the load device continues in the normal fashion.

However, if proof contacts 11 do not close within the time period of timer TR, indicating some malfunction of the load, the alarm circuits are energized as follows: At the end of its time period (say 15 seconds), timer TR closes its contacts TR-2 to connect the coil of relay S across conductors 13, 14 through the contacts A-4 of relay A, a resistor 23, a diode 24, and the normally closed contacts of a "reset" pushbutton switch 25. Relay S thereupon actuates the alarm circuits in the following manner: closure of contacts S-5 of relay S connects the coil of a horn relay HR across conductors 13, 14 through contacts A-2, thereby energizing this latter relay to close contacts HR-2 in the energizing circuit a horn or other audible alarm device 26. This connects horn 26 across the output conductors of source 20 to provide an audible output advising the operator of the malfunction.

Simultaneously with this action, relay S also connects a flasher relay FL to conductors 13, 14 through its contacts S-6. Upon energization, flasher relay FL closes its contacts FL-2 to connect the coil of a flasher-timer FR to source 20. Device FR, when energized, periodically opens and closes its contacts FR-2, to provide the unique dim-bright flashing action of annunciator light 15. It will be noted that annunciator light 15, which had been connected to conductors 13, 14 through start switch 10 at the start of a cycle, is disconnected therefrom by the opening of contacts S-2 upon energization of relay S. However, light 15 is then connected to conductors 13, 14 through contacts S-7 of relay S and contacts FR-2 of flasher FR.

Light 15 has full voltage thereacross and burns brightly in this manner until flasher FR opens contacts FR-2 in the cyclic manner discussed above, thereby disconnecting light 15 from conductors 13, 14 and connecting it to dim bus conductor 28 which has a reduced voltage thereon relative to that of conductors 13, 14. This reduced voltage reduces the intensity of light 15, so that a dimming action occurs therein until flasher FR again connects it to conductors 13, 14. This alternate connection of light 15 to "bright" conductors 13, 14 and to dim bus 28 continues, to produce a dim-bright flashing of light 15 which readily attracts the attention of the attendant to the proper annunciator section.

Thus, the device of the present invention provides both an audible and a visual indication of a malfunction in the monitored device, the visual indication being of a unique dim-bright type which is readily recognized by an attendant.

In the embodiment shown, horn 26, flasher FR, timer TR, time delay relay TD, flasher relay FL and horn relay HR are common to all the annunciator units connected to the busses, while light 15 is individual to each annunciator unit.

If it is desired to silence the audible alarm from horn 26, the "silence" pushbutton 22 is operated, thereby deenergizing relay A, which in turn opens contacts A-2 to deenergize horn relay HR. This opens contacts HR-2 to disconnect horn 26 from source 20. The present annunciator unit has "memory" capacity in that annunciator light 15 continues to flash even after horn 26 is silenced. Thus, if the horn and annunciator were energized at some time when trained personnel were not in attendance and the horn was silenced by a janitor or the like, annunciator light 15 would continue its dim-bright flashing to subsequently notify the trained personnel of a trouble point.

If it is desired to reset or retry the system after an abnormal condition has been indicated, reset button 25 is actuated, thus deenergizing the coil of relay S to drop out this relay. This action disconnects flasher relay FL through contacts S-6, thereby disconnecting flasher FR and reconnecting annunciator light 15 to conductors 13, 14 through contacts S-2. Dropping out of relay S also deenergizes horn relay HR through contacts S-5 and deenergizes time delay TD through contacts S-4, so that the unit is then ready to again start a cycle. This reset operation might be used when an abnormal condition had been indicated during an unattended period as discussed above, and it was desire to ascertain whether the abnormal condition still persisted or whether it was of short duration and had cleared itself. If the trouble still persisted, the device involved could be checked; if the trouble had cleared itself, the annunciator alarms have sounded an indication to the operator of a potential future trouble spot which should be watched.

Referring to FIG. 2, there is shown one embodiment of the present invention applied to the sequential starting of a chain of dependent load devices including a fan motor 31 and a pump motor 32. For the present purposes, it may be assumed that motors 31 and 32 are associated with an air conditioning system in which fan motor is to be started first, and after it has started properly, as measured by the closure of the contacts of a vane switch 33 which measures the air flow therefrom, pump motor 32 may be energized to begin, for example, the circulation of chilled water in the air conditioning system.

When the system start switch 10' is moved to the "on" position, the starting relay M for motor 31 is connected across conductors 13, 14 to pick this relay and close contacts M-1 in the armature circuit of motor 31. Motor 31 thereupon starts and if it is functioning properly, vane switch 33 will close in a short time, indicating that there is normal air flow from this fan. It will be noted that by utilizing a proof device such as vane switch 33, which provides a direct measure of the satisfactory operation of the fan, rather than using a measure of motor operation, such as armature current or motor rotation, false indications of satisfactory operation are avoided in the event of mishaps such as clogged ducts, belt or drive slippage between motor and fan, etc.

If vane switch 33 closes within the proper time after energization of motor 31, the coil of auxiliary relay RM is connected across conductors 13, 14 through the closed vane switch, thus picking this relay to close contacts RM-1 and RM-2. Closure of contacts RM-1, which are connected between points P and R corresponding to proof switch 11 of FIG. 1, shorts out relay A of FIG. 1, as discussed above in connection with the description of that figure, to prevent the audible and visual devices in the annunciator circuit from operating.

Closure of contacts RM-2 connects the starting relay M' for pump motor 32 across conductors 13, 14 to pick this relay and close contacts M-2 in the armature circuit of motor 32. Motor 32 is thus energized and starts operation, assuming that it is in satisfactory condition. If motor 32 and its associated equipment are operating satisfactorily, a flow switch 34, which is the proof for motor 32, will close its contacts to connect the coil of the auxiliary relay RM' for the next annunciator unit to conductors 13, 14. Relay RM' is thereupon energized to close its contacts RM'-1 and RM'-2. Closure of contacts RM'-1 shorts out the A relay for that annunciator unit, in a manner similar to that described above, to prevent the alarm circuits for that unit from being activated, while closure of contacts RM'-2 energizes the equivalent of starting relays M and M' for the next succeeding device in the chain.

Thus, the auxiliary relays of the present invention are operative to provide supervisory control and interlocking of the sequential starting of a chain of dependent devices, and are effective to provide an indication of malfunctioning in the operation of any device and to prevent the further energization of any subsequent device in the chain in the event of such malfunctioning.

It will be noted from FIG. 2 that the use of the closed-satisfactory contacts in the proof circuits provides a fail-safe feature in that any electrical failure in the proof circuit, such as a break in the wire or the like, will act like a pair of open contacts in the proof switch to trigger the annunciator alarms.

It will be further noted from FIGS. 1 and 2 that the annunciator unit of this invention acts as a master disconnect switch since pulling of the pluggable annunciator unit card isolates the circuitry of that point from the busses and the remainder of controlled devices, as indicated by the pluggable unit legends on the drawings.

While the invention has been particularly shown and described with reference to a preferred embodiment thereof, it will be understood by those skilled in the art that the foregoing and other changes in the form and details may be made therein without departing from the spirit and scope of the invention.

What we claim is:

1. Annunciator apparatus for controlling the sequential starting of a plurality of dependent load devices in a chain comprising:
   an annunciator unit associated with each of said load devices and having alarms means therein,
   proof means associated with each of said load devices for providing a measure of the satisfactory operation of said load devices,
   auxiliary relay means connected in circuit with each of said proof devices so as to be energized upon operation of the associated one of said proof devices,
   first contact means for each said auxiliary relay means operable upon energization of said relay means to energize the next one of said load devices in said chain,
   second contact means for each said relay means connected to said annunciator unit and operable upon energization of said relay means for preventing operation of said alarm means therein upon satisfactory operation of the associated one of said load devices, and time delay means energizing said alarm means for operation thereof upon failure of the said proof means to provide a measure of satisfactory operation of the associated one of said load devices after a time delay following energization of the associated one of said load devices.

2. Annunciator apparatus for controlling the sequential starting of a plurality of dependent load devices in a chain comprising:
   an annunciator unit associated with each of said load devices and having alarm means therein,
   proof means associated with each of said load devices and having switch means which close upon satisfactory operation of said load devices,
   auxiliary relay means connected in circuit with each of said proof devices so as to be energized upon closure of said switch means of the associated one of said proof devices,
   first contact means for each said auxiliary relay means operable upon energization of said relay means to energize the next one of said load devices in said chain,
   second contact means for each said relay means connected to said annunciator unit and operable upon energization of said relay means for preventing operation of said alarm means therein upon satisfactory operation of the associated one of said load devices, and time delay means energizing said alarm means for operation thereof upon failure of said switch means of the proof means to close after a time delay following energization of the associated one of said load devices.

3. Annunciator apparatus for controlling the sequential starting of a plurality of dependent load devices in a chain comprising:
   an annunciator unit associated with each of said load devices and having alarm means therein,
   time delay means responsive to energization of said load device for initiating a delay cycle, said delay cycle being longer than the period normally required for said load device to assume normal operation after energization, proof means associated with each of said load devices and having switch means which close upon satisfactory operation of said load devices, auxiliary relay means connected in circuit with each of said proof devices so as to be energized upon operation of the associated one of said proof devices.

first contact means for each said auxiliary relay means operable upon energization of said relay means to energize the next one of said load devices in said chain, second contact means for each said relay means connected to said annunciator unit for preventing operating of said alarm means therein upon satisfactory operation of the associated one of said load devices, and means responsive to completion of said delay cycle while said switch means of said proof means remain open for energizing said alarm means.

4. Annunciator apparatus for controlling the sequential starting of a plurality of dependent load devices in a chain comprising:

an annunciator unit associated with each of said load devices and having alarm means therein, time delay means responsive to energization of said load device for initiating a delay cycle, said delay cycle being longer than the period normally required for said load device to assume normal operation after energization, proof means associated with each of said load devices for generating a direct measure of the satisfactory operation of said load devices, auxiliary relay means connected in circuit with each of said proof devices so as to be energized upon operation of the associated one of said proof devices, first contact means for each said auxiliary relay means operable upon energization of said relay means to energize the next one of said load devices in said chain, second contact means for each said relay means connected to said annunciator unit and operable upon energization of said relay means for preventing operation of said alarm element therein upon satisfactory operation of the associated one of said load devices, and means responsive to completion of said delay cycle prior to generation of said direct measure of said satisfactory operation for energizing said alarm means.

5. Annunciator apparatus for controlling the starting of a load device comprising:

a proof device associated with said load device having a first condition when said load device is operating normally and a second condition when said device is not operating normally, time delay means responsive to energization of said load device for initiating a delay cycle, said delay cycle being longer than the period normally required for said load device to assume normal operations after energization, said first condition of said proof device being operable to deenergize said time delay means prior to the completion of said delay cycle, alarm means associated with said annunciator apparatus, and relay means responsive to completion of said delay cycle while said proof device remains in said second condition for energizing said alarm means.

6. Annunciator apparatus for controlling the starting of a load device comprising:

a proof device associated with said load device having a first condition when said load device is operating normally and a second condition when said device is not operating normally, time delay means responsive to energization of said load device for initiating a delay cycle, said delay cycle being longer than the period normally required for said load device to assume normal operation after energization, said first condition of said proof device being operable to de-energize said time delay means prior to the completion of said delay cycle, unitary visual indicating means having a first steady intensity prior to energization of said load device and having a second, higher intensity after energization of said device, and relay means responsive to completion of said delay cycle while said proof device remains in said second condition for alternately energizing said visual indicating means between said first intensity and said second intensity.

7. Apparatus in accordance with claim 6 including flasher means energized by said relay means for alternately energizing said visual indication means between said first intensity and said second intensity.

8. Annunciator apparatus for controlling the starting of a load device comprising:

a proof switch associated with said load device, said switch being closed when said load device is operating satisfactorily and being open when said device is not operating satisfactorily, time delay means responsive to energization of said load device for initiating a delay cycle, said delay cycle being longer than the period normally required for said load device to assume normal operation after energization, said closed condition of said proof switch being operable to deenergize said time delay means prior to the completion of said delay cycle, audible alarm means for indicating the malfunctioning of said load device, and relay means responsive to completion of said delay cycle while said proof switch remains open for energizing said audible alarm means, and visual indicating means responsive to energization of said relay means for producing a visual alarm which alternates between two levels of intensity.

9. Annunciator apparatus for indicating the status of equipment having a start device associated therewith for energizing said equipment and a proof device associated therewith, said proof device having a first condition when said equipment is operating normally and a second condition when said equipment is not operating normally, comprising:

unitary visual indicating means having a first energized steady intensity condition prior to energization of said start device and having a second energized intensity condition after energization of said start device, and relay means responsive to said second condition of said proof device for alternately energizing said visual indicating means between said first energized intensity condition and said second energized intensity condition.

10. Annunciator apparatus for indicating the status of equipment having a start device associated therewith for energizing said equipment and a proof device associated therewith, said proof device having a first condition when said equipment is operating normally and a second condition when said equipment is not operating normally, comprising:

time delay means responsive to energization of said equipment for initiating a delay cycle, said delay cycle being longer than the period normally required for said equipment to assume normal operation after energization, unitary visual indicating means having a first energized steady intensity condition prior to energization of said equipment and having a second energized intensity condition after energization of said equipment, said relay means responsive to completion of said delay cycle while said proof device is in said second condition for alternately energizing said visual indicating means between said first energized intensity condition and second energized intensity condition.

References Cited by the Examiner

UNITED STATES PATENTS

| | | | |
|---|---|---|---|
| 1,951,012 | 3/1934 | Finney | 318—447 |
| 2,293,474 | 8/1942 | Schneider | 340—267 |
| 2,709,249 | 5/1955 | Sperry | 340—213.1 |
| 2,782,401 | 2/1957 | Boddy | 340—213 |
| 3,039,086 | 6/1962 | Inc et al. | 340 |

NEIL C. READ, *Primary Examiner.*

ROBERT H. ROSE, *Examiner.*